Figure 1:
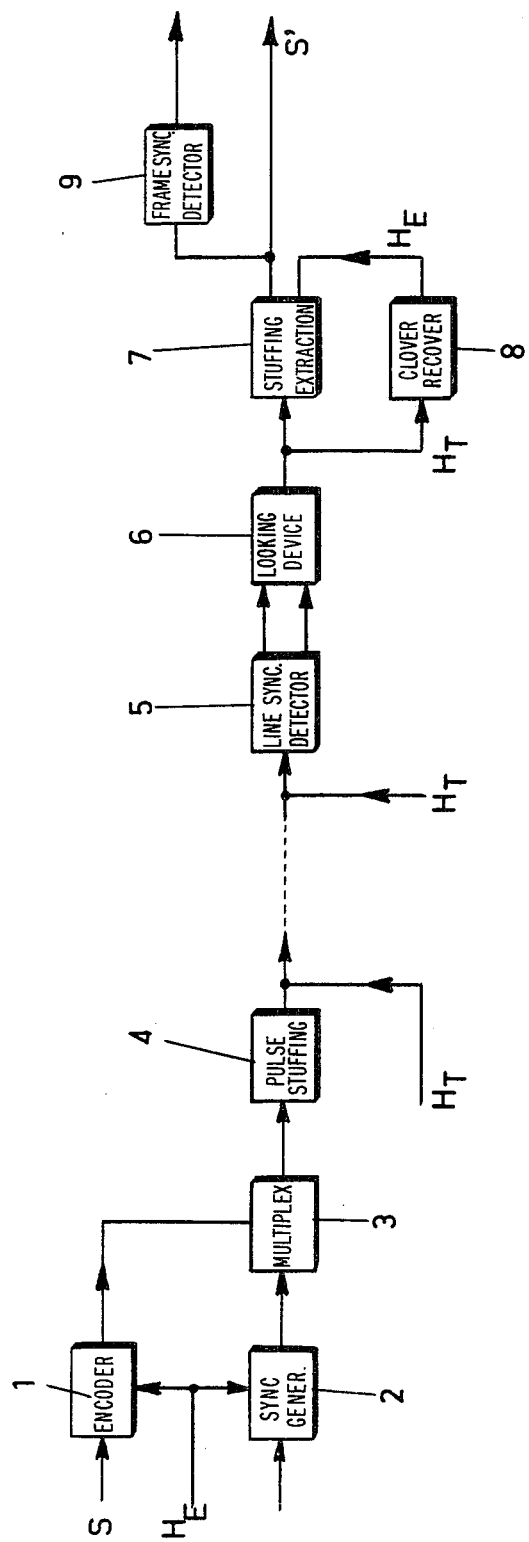

United States Patent [19]

Jolivet et al.

[11] 4,069,504
[45] Jan. 17, 1978

[54] DIGITAL TRANSMISSION METHOD FOR CODED VIDEO SIGNALS

[75] Inventors: Jean-Claude Jolivet, Saint-Michel-en-Greve; François-Xavier Antoine Stouls, Perros Guirec, both of France

[73] Assignee: Societe Anonyme de Telecommunications, Paris, France

[21] Appl. No.: 698,834

[22] Filed: June 23, 1976

[30] Foreign Application Priority Data

July 3, 1975 France .................................. 75 20865

[51] Int. Cl.² .......................... H04N 7/04; H04N 7/08
[52] U.S. Cl. ....................................... 358/142; 358/264
[58] Field of Search ............... 358/141, 142, 148, 263, 358/264

[56] References Cited

U.S. PATENT DOCUMENTS

| | | | |
|---|---|---|---|
| 3,506,785 | 4/1970 | Harris, Jr. | 358/264 |
| 3,755,624 | 8/1973 | Sekimoto | 358/142 |

*Primary Examiner*—Richard Murray
*Attorney, Agent, or Firm*—Jacobs & Jacobs

[57] ABSTRACT

A method for the digital transmission of coded video signals with a fixed number of binary digits per frame dot, wherein each line of the video signal comprises a line synchronization word multiplexed during the line fly-back period, comprising using as line synchronization-word a pseudorandom sequence the self-correlation function of which is such that the synchronization word can be detected at the receiving equipment within a window of at least 3 binary digits, and stuffing each line of the video signal by eventually adding or subtracting one binary digit during the line flyback period at a fixed location in relation to the line synchronizing word.

1 Claim, 2 Drawing Figures

DIGITAL TRANSMISSION METHOD FOR CODED VIDEO SIGNALS

The invention relates to a digit transmission method for coded video signals, in particular coded video-telephone signals.

There are known methods for coding separately the line and frame synchronization words of the video signals and thereafter to multiplex them in the digital signal by inserting them into the line fly-back period, during which no information is transmitted.

On the other hand, it is necessary for the transmission to make the incoming video signal supplied by an encoder synchronous, as this signal is subject to a jitter and frequency drifts which have to be compensated for in order to obtain a fixed transmission digit rate. To this purpose, the digit rate of the incoming signal is adjusted to a rate fixed by a transmission clock through pulse stuffing of the incoming signal.

The pulse stuffing can be conditional if the digit rate of the encoder and the transmission rate have the same nominal values, and it can be systematic if the nominal values are different.

The object of the invention is a method for the digital transmission of video signals which allows the pulse stuffing of the incoming signal to be achieved in a very simple manner.

To this purpose, a pseudorandom sequence is used as a line synchronization word whose self-correlation function is such that the synchronization word can be detected at the receiving equipment within a window of at least 3 binary digits, whereafter each line of the video signal is stuffed by eventual addition or suppression of one binary digit during the line suppression period at a fixed location in relation with the line synchronization word.

The line frequency is usually fixed, for instance 8 kHz. This means that all the lines have the same number of binary digits, this number depending on the encoding procedure used. The use of the aforesaid pseudorandom sequence as line synchronization word allows the pulse stuffing to be synchronized with respect to the line synchronization word. The reason is that the pulse stuffing may modify the number of binary digits in one line by ± 1 digit without disturbing detection of the line synchronization word at the receiving equipment, as this detection is possible within a window of at least 3 binary digits due to the pattern of the line synchronization word.

The method of the invention avoids therefore using a particular digital frame for the stuffing which would involve more important equipment and therefore higher costs.

Figure 2:
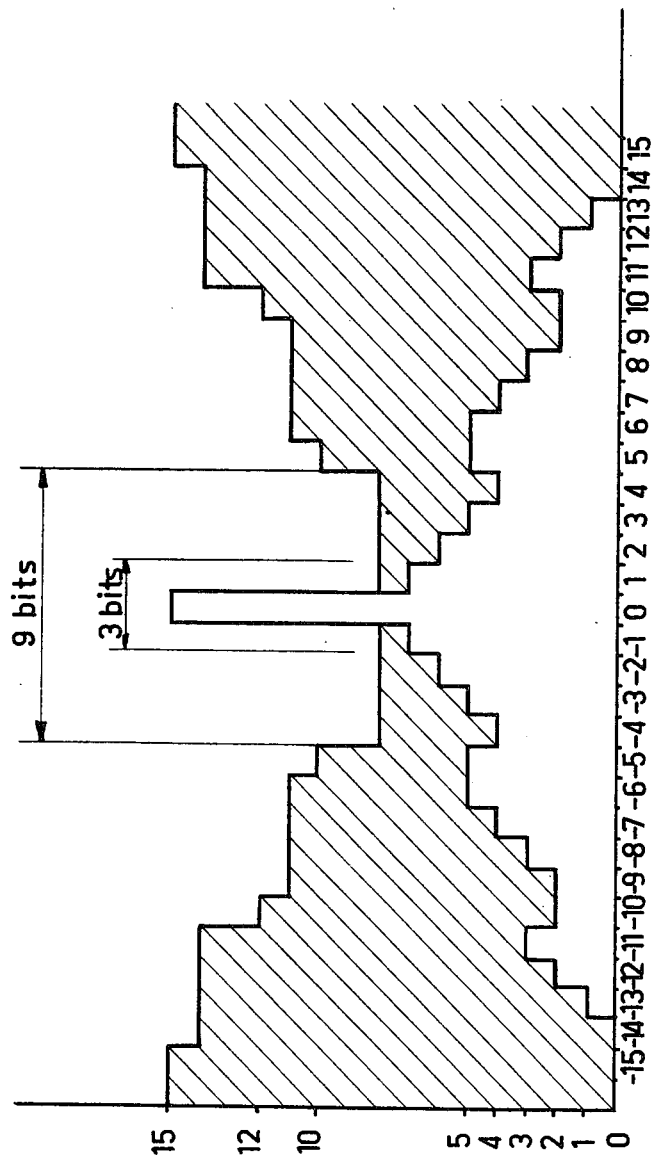

The invention will become more apparent from the following description taken in conjunction with the accompanying drawings wherein:

- FIG. 1 is a block diagram of the device for performing the transmission method of the invention;
- FIG. 2 illustrates the self-correlation function of the pseudorandom sequence used for the line synchronization, the shift being plotted on the x-axis and the number of coincidences on the y-axis.

The analog video signal S is coded by means of an encoder 1, for instance a differential PCM encoder, then multiplexed in a multiplexer 3 with the line and frame synchronization words generated by the synchronization generator 2, the synchronization words being inserted during the line fly-back period. Operation of these devices is regulated by the emitting clock $H_E$.

In the case of a video telephone signal, the line frequency is 8 kHz, the frame comprises 251 lines and the signal has a 2 : 1 line interlaced format i.e. each frame is transmitted according to two fields each comprising lines of the same parity. Each line is made of a number of dots, e.g. 256 dots, each dot being encoded by means of a fixed number of binary digits, this number depending on the encoding type used.

Device 2 generates at a frequency of 8 kHz a 15 bit-synchronization word constituting the line synchronization word, followed by one bit for the frame synchronization during the first 127 lines of the frame and by "0" bit during the remaining lines.

The line synchronization word is the pseudorandom sequence 1 001 10101 111 000 whose self-correlation function is showed in FIG. 2 and presents a marked narrow central lobe.

The self-correlation function is obtained by counting the number of coincidences between the word and the word shifted by 1, 2 . . . n binary digits. The hatched portion of FIG. 2 corresponds to the uncertainties due to the constitution of the digit stream, the binary digits located before and after the synchronization sequence being unknown.

It can be seen that with the shift of only one bit, there are left only 7 to 8 coincidences, that with a shift of 2 bits, there are from 6 to 8 coincidences, etc. The interest of such a sequence is that the synchronization word can be detected without ambiguity within a window of 9 bits as indicated on FIG. 2, with up to 3 transmission errors on the sequence, that is with at least 12 coincidences.

Similarly, the frame synchronization is supplied by a pseudorandom sequence of 127 bits distributed on the b 127 first lines of the frame. In this case, it is considered that the synchronization is detected with 100 coincidences, that is up to 27 errors can be admitted.

Such pseudorandom sequences are well known per se; the line synchronization sequence can be obtained by means of a 4 bit-register, and the frame synchronisation sequence of 127 bits by means of a 8 bit-register.

The signal from multiplexor 3 is thereafter applied to a pulse stuffing device 4, known per se, which adapts the signal digit rate, which can be varied for various reasons, to the transmission rate fixed by the transmission clock $H_T$. The pulse stuffing is made on each line of the signal and consists, as the case may be, in substracting or adding one bit, or in leaving the signal unchanged.

Device 4 is synchronized with the line synchronization word in such manner that the substracting or adding of one bit is made at a determined location of the video signal line suppression period. On the other hand as no video information is transmitted during that period, it is possible to perform a negative pulse stuffing (substracting one bit) without any loss of information.

The pulse stuffing thus results in possibly varying by ± 1 bit the number of bits between two consecutive line synchronization words.

At the receiving equipment, the line synchronization word is investigated in a synchronization detector 5 having stored therein the aforesaid 15 bit-word. On starting and for reliability purposes, it is considered that the synchronization is found when 15 coincidences are counted. Once this detection is made, the system is locked by device 6. Synchronization is thereafter investigated within a 3 bit-window centered on the expected location of the synchronization word which is determined by the nominal periodicity of the synchronization sequences. This 3 bit-window corresponds of course to possible variations of ± 1 bit caused by the pulse stuffing.

It is known on the other hand that owing to the pattern of the synchronization word detection may take place within a 9 bit-window, therefore with greater reason the detection may take place within a 3 bit-window.

Once the system is locked, the aforesaid synchronization word pattern allows a majority detection with 12 coincidences, to be employed i.e. one can have up to 3 errors without losing the synchronization.

If the synchronization is lost, that is if the detection does not take place at the expected location, the lock is lost and the initial situation repeats itself, i.e. the synchronization word, is permanently investigated and detection necessitates 15 coincidences.

The synchronization detector 5 and the locking device 6 are conventional, the locking device comprising an internal time base supplying the 3 bit-window centered on the theoretical location of the synchronization word.

The shift of the synchronization word in relation to its theoretical location allows the pulse stuffing to be extracted in a device 7, and the emitting clock $H_E$ is recovered by multiplication and filtering of the synchronizing word frequency in a device 8.

Finally, in order to obtain frame synchronization, one detects the frame synchronizing binary digit in a detector 9 after having locked the line synchronization. The last 127 binary elements thus detected are stored and compared with a sequence identical to that generated in detector 9 at the transmitting equipment. When the received sequence is identical to the frame synchronisation sequence, with an approximation of 27 binary digits, the 127 line has been reached and synchronization of the frame time base takes place. This detection procedure is advantageous in that a large number of errors (27 out of 127) can be accepted and also this distributed frame synchronization information is well protected against errors happening in lots, particularly in hertzian transmissions.

What we claim is:

1. A method for the digital transmission of coded video signals with a fixed number of binary digits per frame dot, wherein each line of the video signal comprises a line synchronization word multiplexed during the line fly-back period, comprising using as line synchronization-word a pseudorandom sequence the self-correlation function of which is such that the synchronization word can be detected at the receiving equipment within a window of at least 3 binary digits, and stuffing each line of the video signal by eventually adding or substracting one binary digit during the line fly-back period at a fixed location in relation to the line synchronizing word.

* * * * *